US011920045B2

(12) United States Patent
Noguchi et al.

(10) Patent No.: US 11,920,045 B2
(45) Date of Patent: Mar. 5, 2024

(54) ACTIVE-ENERGY-RAY-CURABLE COMPOSITION, ACTIVE-ENERGY-RAY-CURABLE INK COMPOSITION, ACTIVE-ENERGY-RAY-CURABLE INKJET INK COMPOSITION, COMPOSITION STORED CONTAINER, TWO-DIMENSIONAL OR THREE-DIMENSIONAL IMAGE FORMING APPARATUS, TWO-DIMENSIONAL OR THREE-DIMENSIONAL IMAGE FORMING METHOD, CURED MATERIAL, AND DECORATED ARTICLE

(71) Applicants: RICOH COMPANY, LTD., Tokyo (JP); TOKYO UNIVERSITY OF SCIENCE FOUNDATION, Tokyo (JP)

(72) Inventors: Soh Noguchi, Kanagawa (JP); Mitsunobu Morita, Shizuoka (JP); Takashi Okada, Kanagawa (JP); Tatsuki Yamaguchi, Kanagawa (JP); Koji Arimitsu, Tokyo (JP)

(73) Assignees: Ricoh Company, Ltd., Tokyo (JP); Tokyo University of Science Foundation, Tokyo (JP)

( * ) Notice: Subject to any disclaimer, the term of this patent is extended or adjusted under 35 U.S.C. 154(b) by 567 days.

(21) Appl. No.: 16/837,153

(22) Filed: Apr. 1, 2020

(65) Prior Publication Data

US 2020/0308425 A1 Oct. 1, 2020

(30) Foreign Application Priority Data

Apr. 1, 2019 (JP) ................................ 2019-069922
Sep. 10, 2019 (JP) ................................ 2019-164371

(51) Int. Cl.
*C09D 11/10* (2014.01)
*B33Y 70/00* (2020.01)
(Continued)

(52) U.S. Cl.
CPC ............ *C09D 11/101* (2013.01); *B33Y 70/00* (2014.12); *C09D 11/38* (2013.01); *B29C 64/112* (2017.08); *B33Y 10/00* (2014.12)

(58) Field of Classification Search
CPC ..... C09D 11/38; C09D 11/101; B29C 64/106; B29C 64/112; C33Y 10/00; C33Y 70/00
See application file for complete search history.

(56) References Cited

U.S. PATENT DOCUMENTS 7,612,122 B2 * 11/2009 Herlihy .............. C07D 295/112 522/90
8,338,499 B2 * 12/2012 Loccufier .................. C08F 2/50 522/182

(Continued)

FOREIGN PATENT DOCUMENTS

CS 256714 B1 * 4/1988
EP 2725075 A1 * 4/2014 ........... C09D 11/101

(Continued)

OTHER PUBLICATIONS

Japanese Office Action dated Jun. 15, 2022, in Japanese Application No. 2019-164371, with English translation, 10 pages.

(Continued)

*Primary Examiner* — Sanza L. McClendon
(74) *Attorney, Agent, or Firm* — Grüneberg and Myers PLLC

(57) ABSTRACT

To provide an active-energy-ray-curable composition including a compound represented by General Formula (I) below:

General Formula (I)

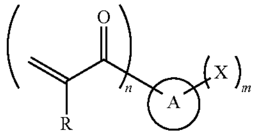

where in the General Formula (I), R is hydrogen or a methyl group; A is a structure expressed by one selected from the group consisting of Structural Formulas (II) to (VII) below, each of which may have a substituent such as an alkyl group or an alkoxy group, or both; j and k in the Structural Formulas (VI) and (VII) are an integer of 0 or more; X denotes a substituent including a heteroatom; n is an integer of 0 or more, m is an integer of 1 or more, and n+m is 3 or more, or n is an integer of 0 and m is an integer of 2; and wavy lines in the Structural Formulas (II) to (VII) each independently denote a bond with X or a (meth)acryloyl group ($H_2C{=}CR{-}C({=}O){-}$):

Structural Formula (II)

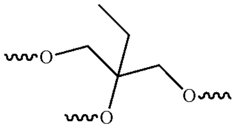

Structural Formula (III)

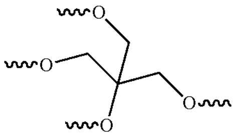

Structural Formula (IV)

(Continued)

-continued

Structural Formula (V)

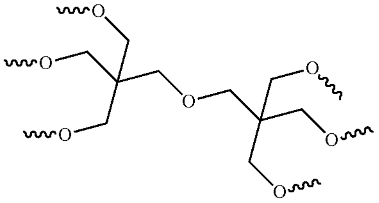

Structural Formula (VI)

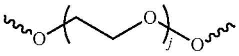

Structural Formula (VII)

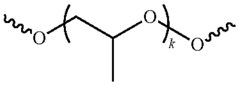

.

18 Claims, 3 Drawing Sheets

(51) Int. Cl.

| | |
|---|---|
| ***C09D 11/101*** | (2014.01) |
| ***C09D 11/38*** | (2014.01) |
| *B29C 64/112* | (2017.01) |
| *B33Y 10/00* | (2015.01) |

(56) References Cited

U.S. PATENT DOCUMENTS

| | | | |
|---|---|---|---|
| 8,632,174 B2 | 1/2014 | Noguchi et al. | |
| 8,727,522 B2 | 5/2014 | Maekawa et al. | |
| 8,815,140 B2 | 8/2014 | Aruga et al. | |
| 8,871,861 B2 | 10/2014 | Shoshi et al. | |
| 9,267,043 B2 | 2/2016 | Morita et al. | |
| 9,796,862 B2 | 10/2017 | Morita et al. | |
| 10,005,922 B2 | 6/2018 | Noguchi et al. | |
| 10,174,215 B2 | 1/2019 | Morita et al. | |
| 2010/0313782 A1 | 12/2010 | Loccufier et al. | |
| 2011/0060100 A1 | 3/2011 | Kimura et al. | |
| 2012/0147103 A1 | 6/2012 | Hasegawa et al. | |
| 2012/0242768 A1 | 9/2012 | Seno et al. | |
| 2013/0005849 A1 | 1/2013 | Noguchi et al. | |
| 2013/0144057 A1* | 6/2013 | Morita | C07C 271/14 546/245 |
| 2013/0267625 A1 | 10/2013 | Noguchi et al. | |
| 2014/0232790 A1 | 8/2014 | Makuta | |
| 2014/0363634 A1 | 12/2014 | Morita et al. | |
| 2015/0218398 A1* | 8/2015 | Loccufier | C09D 11/38 522/18 |
| 2016/0023984 A1 | 1/2016 | Morita et al. | |
| 2016/0075894 A1 | 3/2016 | Noguchi et al. | |
| 2017/0137644 A1 | 5/2017 | Morita et al. | |
| 2018/0127607 A1 | 5/2018 | Morita et al. | |
| 2019/0284408 A1 | 9/2019 | Suenaga et al. | |
| 2020/0010662 A1 | 1/2020 | Hiraoka et al. | |
| 2020/0031969 A1 | 1/2020 | Kobayashi et al. | |
| 2020/0032068 A1 | 1/2020 | Yamaguchi et al. | |
| 2020/0032089 A1 | 1/2020 | Kobayashi et al. | |
| 2020/0038309 A1 | 2/2020 | Suenaga et al. | |
| 2020/0038310 A1 | 2/2020 | Suenaga et al. | |

FOREIGN PATENT DOCUMENTS

| | | | |
|---|---|---|---|
| GB | 2420117 A * | 5/2006 | C07D 295/112 |
| JP | 2003-253248 | 9/2003 | |
| JP | 2005181734 A * | 7/2005 | |
| JP | 2013-256487 | 12/2013 | |
| JP | 2013256487 A * | 12/2013 | C07C 27/12 |
| JP | 2015-51227 A | 3/2015 | |
| JP | 5788918 B2 | 8/2015 | |
| JP | 2015-531809 | 11/2015 | |
| JP | 5959602 B2 | 7/2016 | |
| JP | 2017-110200 | 6/2017 | |
| JP | 2017-171726 | 9/2017 | |
| JP | 2019-218447 | 12/2019 | |
| WO | WO-2014063918 A1 * | 5/2014 | C09D 11/101 |

OTHER PUBLICATIONS

"Standard Dictionary of Chemical Terms", $2^{nd}$ Edition, published Mar. 31, 2005, by Maruzen Publishing Co., Ltd., with partial English translation, 4 pages.

Office Action dated Mar. 23, 2023, in Chinese Patent Application No. 201880067710.2 filed Oct. 17, 2018, 7 pages.

* cited by examiner

ACTIVE-ENERGY-RAY-CURABLE COMPOSITION, ACTIVE-ENERGY-RAY-CURABLE INK COMPOSITION, ACTIVE-ENERGY-RAY-CURABLE INKJET INK COMPOSITION, COMPOSITION STORED CONTAINER, TWO-DIMENSIONAL OR THREE-DIMENSIONAL IMAGE FORMING APPARATUS, TWO-DIMENSIONAL OR THREE-DIMENSIONAL IMAGE FORMING METHOD, CURED MATERIAL, AND DECORATED ARTICLE

CROSS-REFERENCE TO RELATED APPLICATIONS

The present application claims priority under 35 U.S.C. § 119 to Japanese Patent Application No. 2019-069922 filed Apr. 1, 2019 and Japanese Patent Application No. 2019-164371 filed Sep. 10, 2019. The contents of which are incorporated herein by reference in their entirety.

BACKGROUND OF THE INVENTION

Field of the Invention

The present disclosure relates to an active-energy-ray-curable composition, an active-energy-ray-curable ink composition, an active-energy-ray-curable inkjet ink composition, a composition stored container, a two-dimensional or three-dimensional image forming apparatus, a two-dimensional or three-dimensional image forming method, a cured material, and a decorated article.

Description of the Related Art

An inkjet recording method has been known as a method for forming an image on a recording medium such as paper or plastic. This recording method has a high ink consumption efficiency and an excellent property of saving resources, and can make ink cost per a recording unit low.

In recent years, an inkjet recording method using an ultraviolet-ray-curable ink has attracted attention.

Japanese Translation of PCT International Application Publication No. JP-T-2015-531809 and Japanese Unexamined Patent Application Publication No. 2017-110200 disclose a radiation curable ink, which includes: a monomer containing a vinyl ether group and a (meth)acrylate group; a monomer containing a five-membered cyclic anhydride curable by free radical polymerization; and an aliphatic tertiary amine, and is particularly suitable for legend printing in production of a printed circuit board.

Japanese Patent No. 5959602 discloses a free radical curable liquid that is decreased in unpleasant odors and is suitably used for food package, the free radical curable liquid including: a) a polymerizable compound A containing an acrylate group and a second ethylenically unsaturated polymerizable functional group selected from the group consisting of a vinylether group, an allyl ether group, and an allyl ester group; b) a polymerizable compound B formed of a bifunctional acrylate; and c) a polymerizable compound C selected from the group consisting of triacrylate, tetraacrylate, pentaacrylate, and hexaacrylate.

Japanese Patent No. 5788918 discloses an inkjet recording method that forms an image that has a good film strength and an excellent scratch resistance, and has a small amount of residual monomers, a high safety, and low odors, the method including: providing an active-energy-ray-curable ink composition including a multifunctional polymerizable compound and a sensitizer having a molecular weight of 1,000 or more onto a recording substrate that is an aggregate of a nonabsorbable or low-absorbable fiber material from an inkjet head at a predetermined ink droplet amount with a distance between the recording substrate and the inkjet head being constantly maintained to form an image; and irradiating the formed image with active rays under the condition of an oxygen partial pressure of $1.5\times10^{-2}$ MPa or less to cure the image.

Japanese Unexamined Patent Application Publication No. 2003-253248 discloses a reactive ultraviolet absorber contained in, for example, ink and having a non-bleeding property, the reactive ultraviolet absorber including an alcoholic hydroxyl group, or an alcoholic hydroxyl group and a reactive group such as an epoxy group, and being obtained by reacting 2-(2',4'- dihydroxyphenyl)-2H-benzotriazoles with a compound containing one or more epoxy groups or halogenated alkyl having an alcoholic hydroxyl group.

Because an active-energy-ray-curable composition is cured by irradiation of active energy rays, it is excellent in a drying ability compared to a solvent-based ink composition and is excellent in adhesiveness to a substrate. In recent years, there is an increased demand for safety of the compound. Particularly, when printing is performed on food packages and rigid containers, extractables (migration) of components from a cured material are problematic.

SUMMARY OF THE INVENTION

According to one aspect of the present disclosure, an active-energy-ray-curable composition includes a compound represented by General Formula (I) below:

General Formula (I)

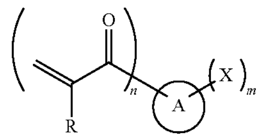

where in the General Formula (I), R is hydrogen or a methyl group; A is a structure expressed by one selected from the group consisting of Structural Formulas (II) to (VII) below, each of which may have a substituent such as an alkyl group or an alkoxy group, or both; j and k in the Structural Formulas (VI) and (VII) are an integer of 0 or more; X denotes a substituent including a heteroatom; n is an integer of 0 or more, m is an integer of 1 or more, and n+m is 3 or more, or n is an integer of 0 and m is an integer of 2; and wavy lines in the Structural Formulas (II) to (VII) each independently denote a bond with X or a (meth)acryloyl group ($H_2C{=}CR{-}C({=}O){-}$);

Structural Formula (II)

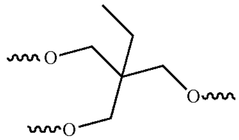

-continued

Structural Formula (III)

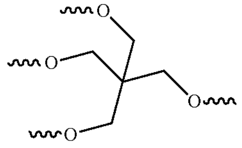

Structural Formula (IV)

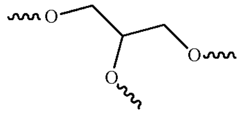

Structural Formula (V)

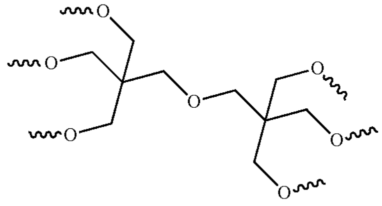

Structural Formula (VI)

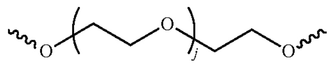

and

Structural Formula (VII)

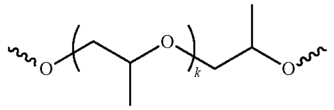

.

DESCRIPTION OF THE EMBODIMENTS

Active-Energy-Ray-Curable Composition

Figure 1:
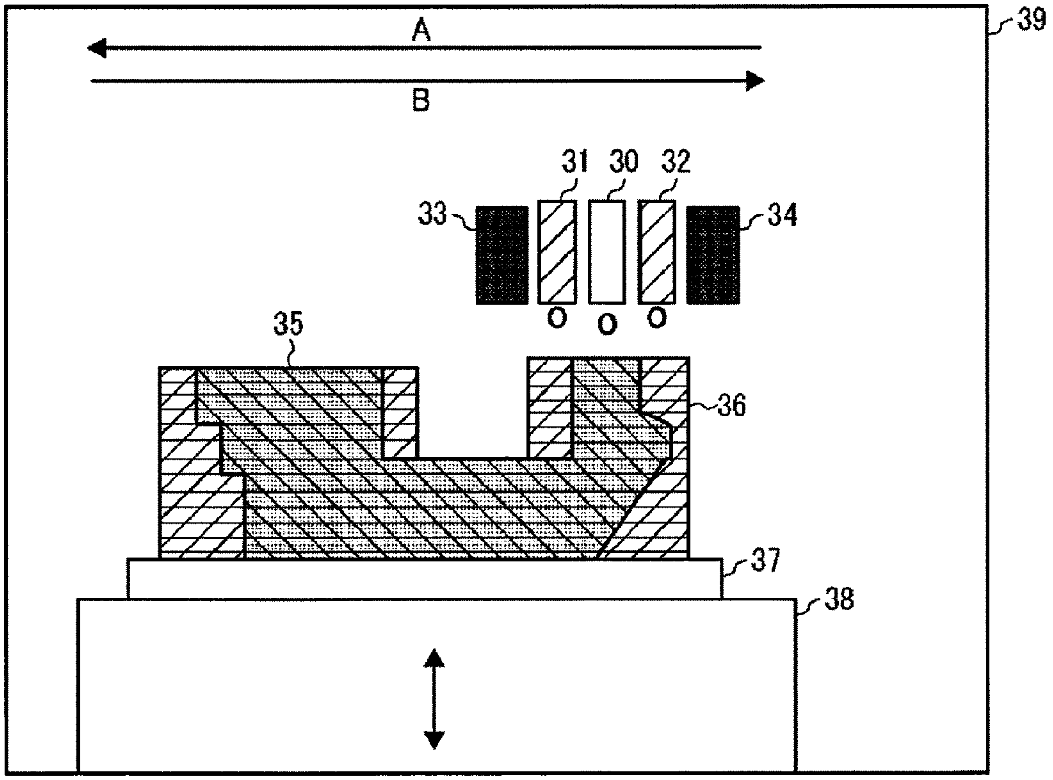
FIG. 1 is a schematic view presenting one example of another image forming apparatus (apparatus for forming a three-dimensional stereoscopic image)
Figure 2A:
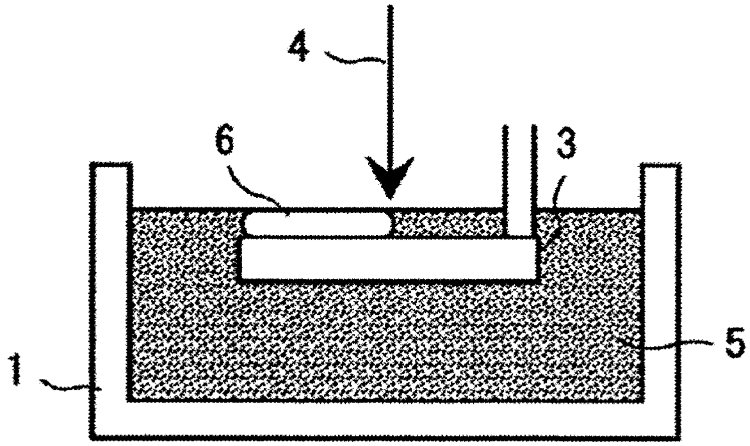
FIG. 2A is a schematic explanation view presenting one example of a method of additive manufacturing using a composition.
Figure 2B:
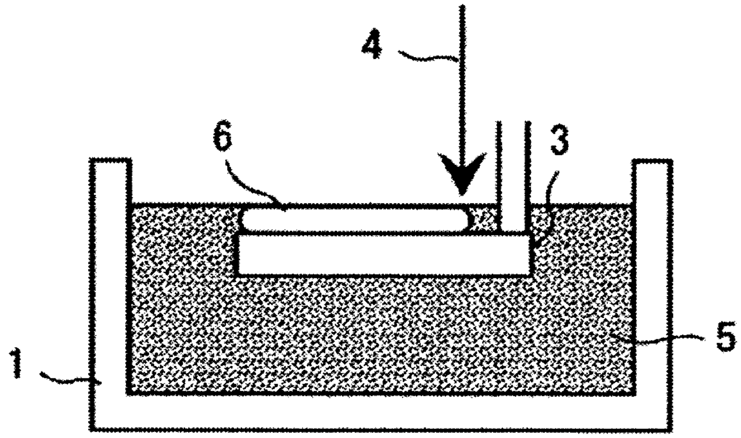
FIG. 2B is a schematic explanation view presenting one example of a method of additive manufacturing using a composition.
Figure 2C:
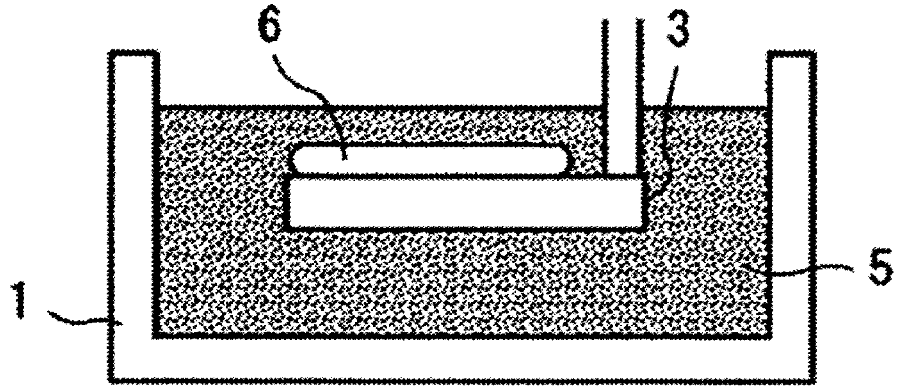
FIG. 2C is a schematic explanation view presenting one example of a method of additive manufacturing using a composition.
Figure 2D:
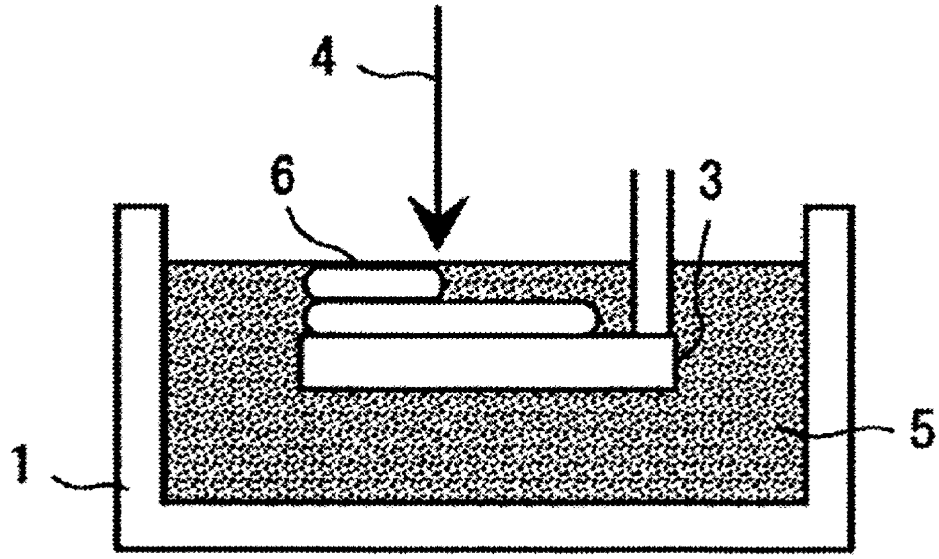
FIG. 2D is a schematic explanation view presenting one example of a method of additive manufacturing using a composition.

An active-energy-ray-curable composition of the present disclosure includes a compound represented by General Formula (I) below, and further includes other components if necessary.

General Formula (I)

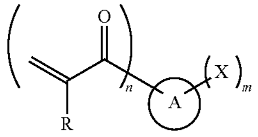

(In the General Formula (I), R is hydrogen or a methyl group; A is a structure expressed by one selected from the group consisting of Structural Formulas (II) to (VII) below, each of which may have a substituent such as an alkyl group or an alkoxy group, or both; j and k in the Structural Formulas (VI) and (VII) are an integer of 0 or more; X denotes a substituent including a heteroatom; n is an integer of 0 or more, m is an integer of 1 or more, and n+m is 3 or more, or n is an integer of 0 and m is an integer of 2; and wavy lines in the Structural Formulas (II) to (VII) each independently denote a bond with X or a (meth)acryloyl group ($H_2C{=}CR{-}C({=}O){-}$)).

Note that, the above term "(meth)acryloyl group" is a term that refers to both an acryloyl group represented by "$H_2C{=}CR{-}C({=}O){-}$" where R is a methyl group and an acryloyl group represented by "$H_2C{=}CR{-}C({=}O){-}$" where R is hydrogen.

Structural Formula (II)

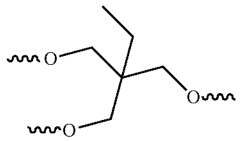

Structural Formula (III)

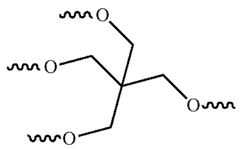

Structural Formula (IV)

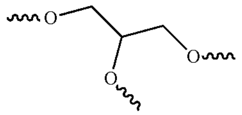

Structural Formula (V)

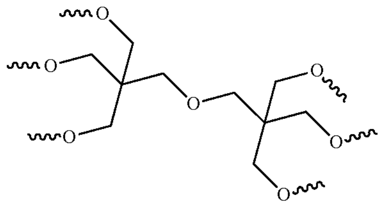

Structural Formula (VI)

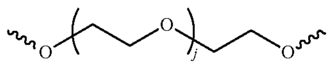

and

Structural Formula (VII)

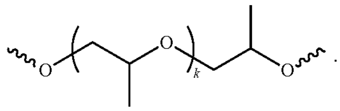

.

Preferably, n and m are an integer of 1 or more, and n+m is an integer of 3 or more, in order to improve reactivity and hardness.

The above X is preferably a cyclic substituent including a heteroatom.

A content of the compound of General Formula (I) is preferably from 5 parts by mass to 20 parts by mass relative to 100 parts by mass of a radically polymerizable compound that will be described hereinafter.

The compound represented by the General Formula (I) may be used alone or in combination. Specific examples thereof include compounds expressed by the following Structural Formulas (A-1) to (A-20).

(A-1)
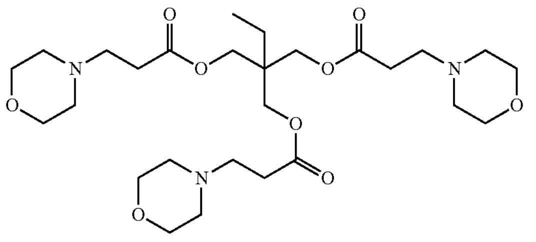
(A-2)
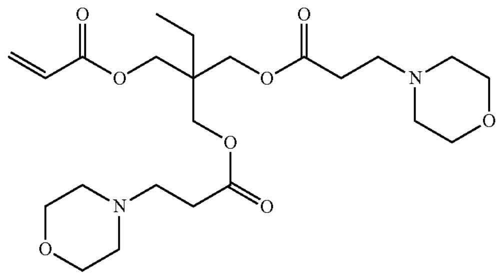
(A-3)
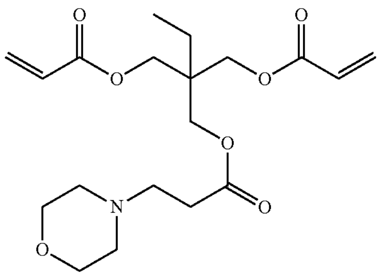
(A-4)
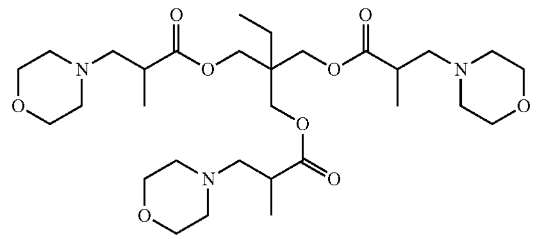
(A-5)
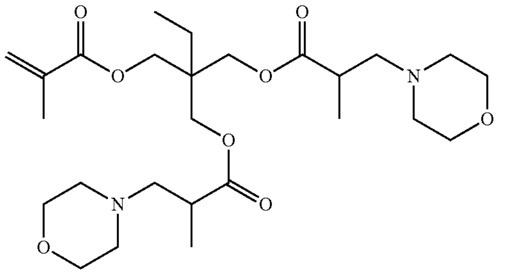
(A-6)
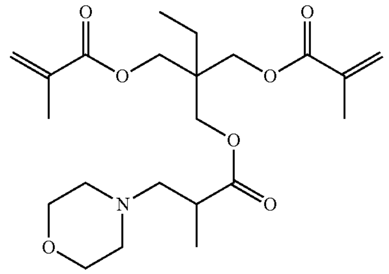
(A-7)
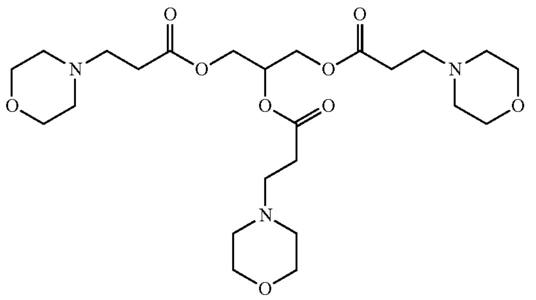
(A-8)
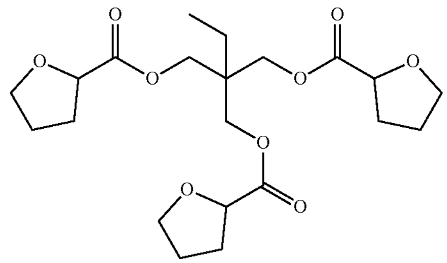
(A-9)
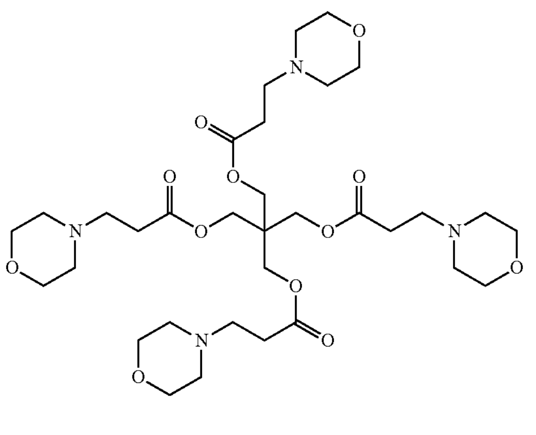
(A-10)
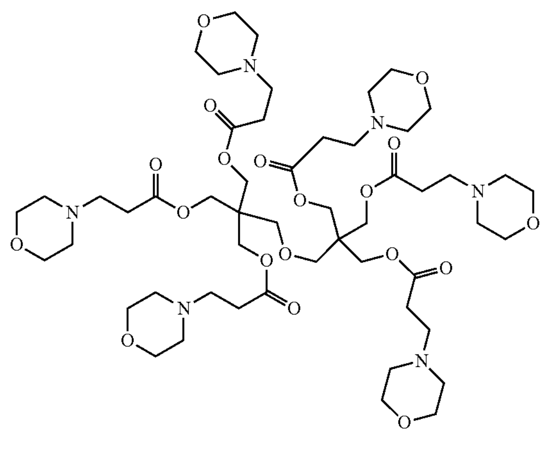

-continued
(A-11)
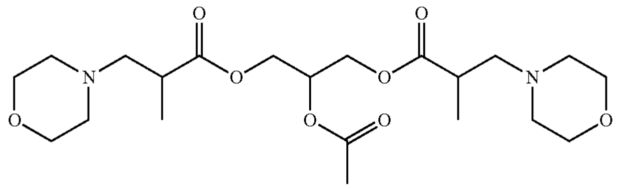
(A-12)
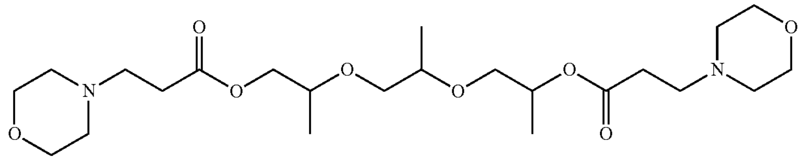
(A-13)
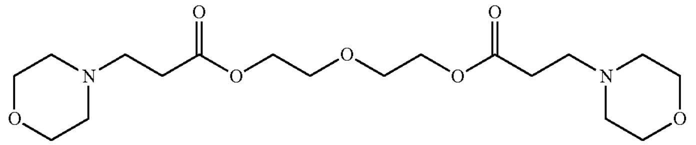
(A-14)
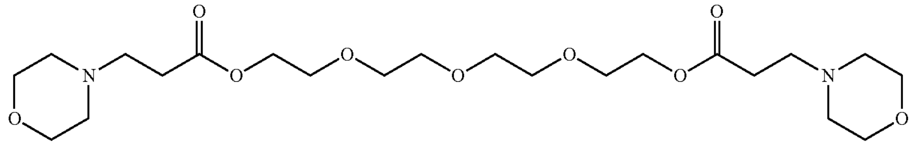
(A-15)
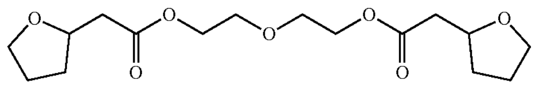
(A-16)
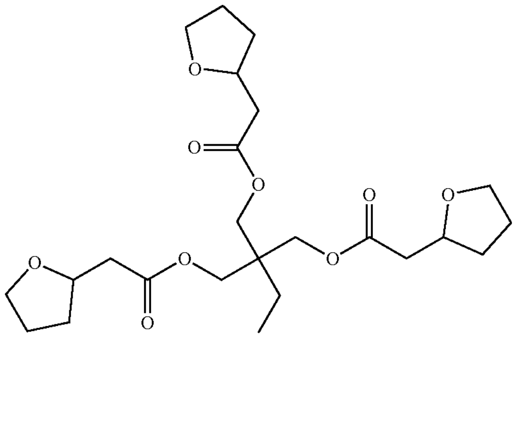
(A-17)
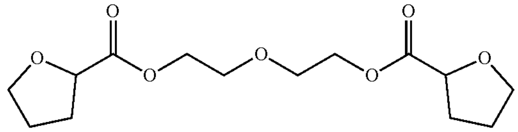
(A-18)
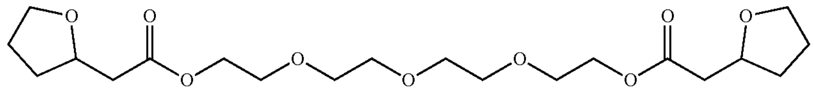

-continued (A-19)

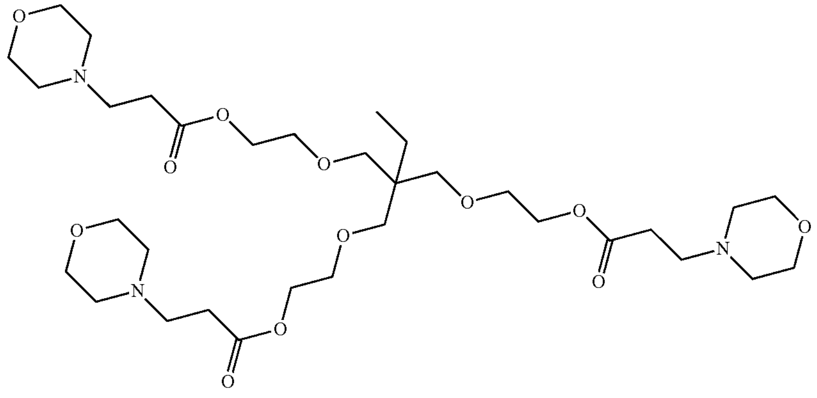

and (A-20)

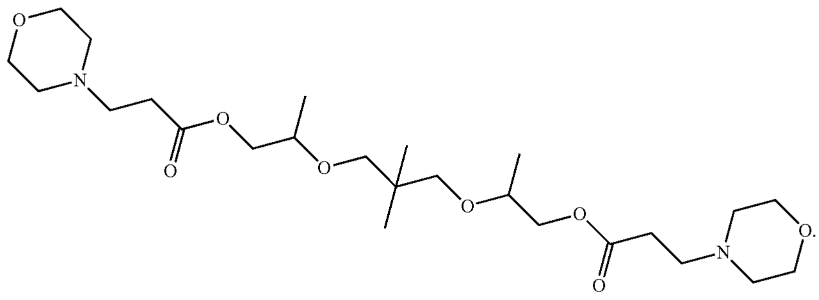

An object of the present disclosure is to provide an active-energy-ray-curable composition that suppresses migration from a cured material and also increases hardness.

According to the present disclosure, it is possible to provide an active-energy-ray-curable composition that can solve the conventionally existing problems and suppresses migration.

Radically Polymerizable Compound

The active-energy-ray-curable composition of the present disclosure includes a radically polymerizable compound in addition to the aforementioned compound represented by the General Formula (I). The radically polymerizable compound is not particularly limited and may be appropriately selected depending on the intended purpose. Examples thereof include, but are not limited to, the following compounds expressed by Structural Formulas (B-1) to (B-24). These may be used alone or in combination.

(B-1)

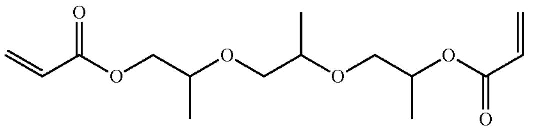

(B-2)

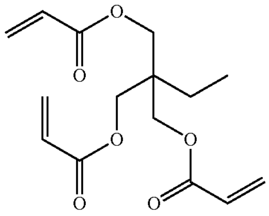

-continued (B-3)

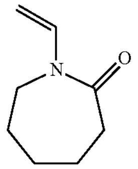

(B-4)

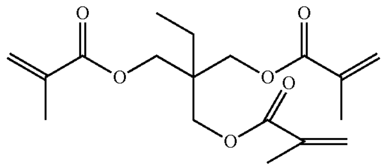

(B-5)

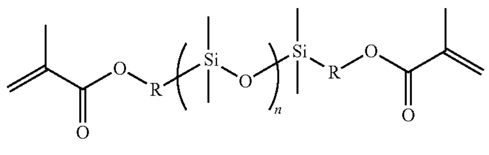

(B-6)

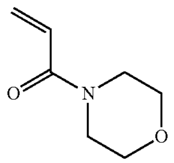

-continued
(B-7)
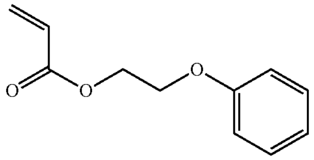
(B-8)
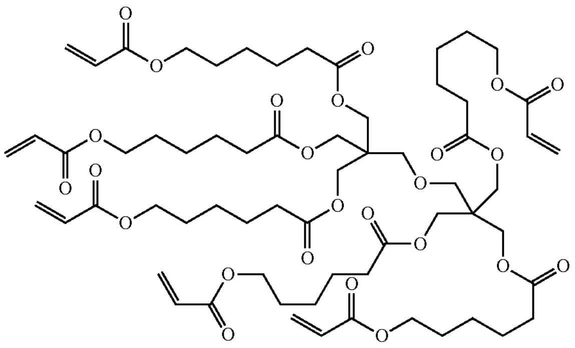
(B-9)
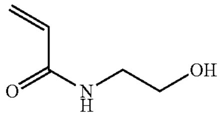
(B-10)
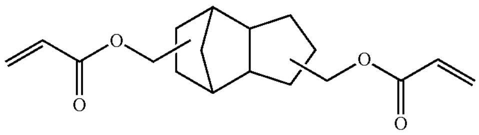
(B-11)
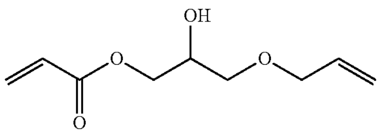
(B-12)
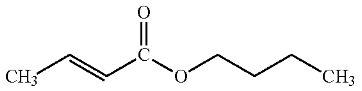
(B-13)
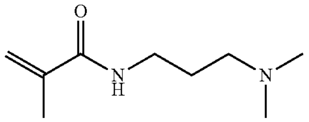
(B-14)
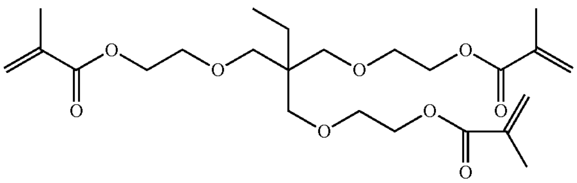
(B-15)
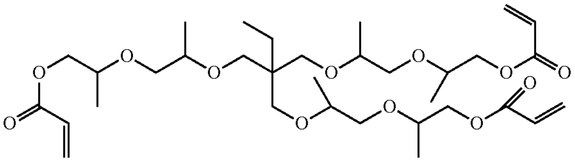
-continued
(B-16)
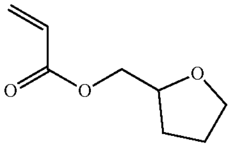
(B-17)
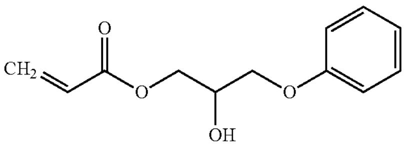
(B-18)
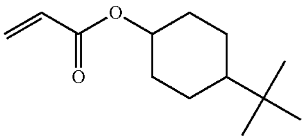
(B-19)
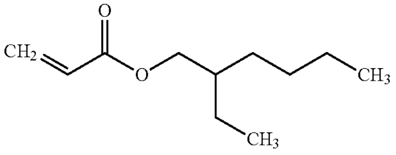
(B-20)
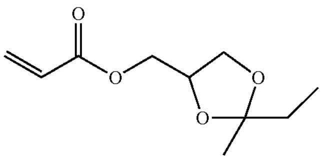
(B-21)
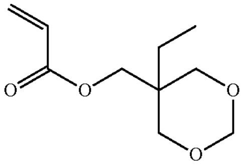
(B-22)
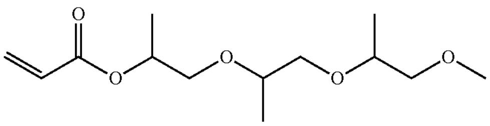
(B-23)
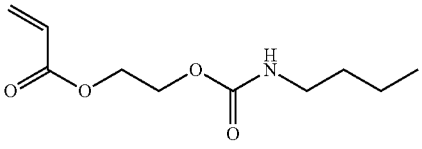
(B-24)
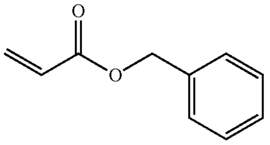
n = 3, R = propylene group
Polymerization Initiator
The polymerization initiator produces active species such as a radical or a cation upon application of energy of an active energy ray and initiates polymerization of a polymerizable compound (monomer or oligomer). As the polymerization initiator, it is suitable to use a known radical polymerization initiator, cation polymerization initiator, base generator, or a combination thereof. Of these, a radical polymerization initiator is preferable. Moreover, the polymerization initiator preferably accounts for 0.2 parts by mass to 20 parts by mass of the reactive compound (100 parts by mass) to obtain sufficient curing speed.

Specific examples of the radical polymerization initiators include, but are not limited to, known compounds such as aromatic ketones, acylphosphine oxide compounds, aromatic onium salt compounds, organic peroxides, thio compounds (thioxanthone compounds, thiophenyl group containing compounds, etc.), hexaaryl biimidazole compounds, ketoxime ester compounds, borate compounds, azinium compounds, metallocene compounds, active ester compounds, compounds having a carbon halogen bond(s), and alkyl amine compounds; and compounds of the following specific examples (C-1) to (C-6).

(C-1)

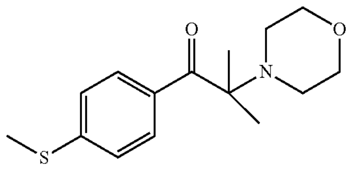

(C-2)

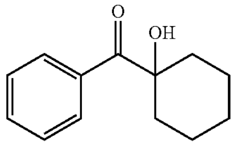

C-3)

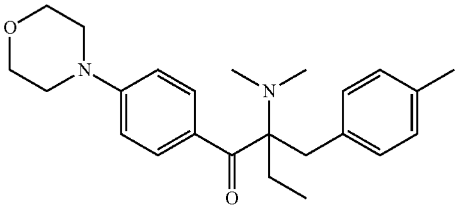

(C-4)

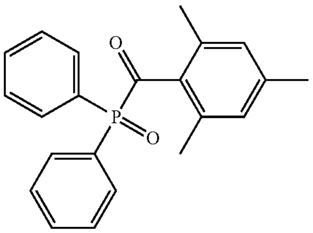

(C-5)

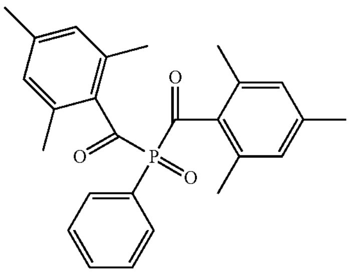

-continued (C-6)

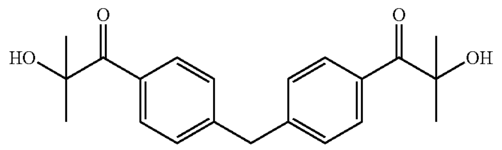

In addition, a polymerization accelerator (sensitizer) is optionally used together with the polymerization initiator. The polymerization accelerator is not particularly limited. Preferred examples thereof include, but are not limited to, amines such as trimethylamine, methyl dimethanol amine, triethanol amine, p-diethylamino acetophenone, p-dimethyl amino ethylbenzoate, p-dimethyl amino benzoate-2-ethylhexyl, N,N-dimthyl benzylamine and 4,4'-bis(diethylamino) benzophenone. The content thereof is determined depending on the identity (type) of the polymerization initiator and the content thereof.

Curing Means

The curable ink in accordance with some embodiments of the present invention comprises an active-energy-ray-curable composition. Preferably, the active-energy-ray-curable composition is cured by application of heat or irradiation with an active energy ray, and the latter is more preferable. Specific examples of the active energy ray for curing the active-energy-ray-curable composition include, but are not limited to, electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

The active-energy-ray-curable composition of the present disclosure may be free of a polymerization initiator in the active-energy-ray-curable composition. When the active-energy-ray-curable composition is free of a polymerization initiator, the active-energy-ray-curable composition free of a polymerization initiator can be used in a composition set including a polymerization initiator.

Colorant

The active-energy-ray-curable composition of the present disclosure may contain a colorant. As the colorant, various pigments and dyes may be used that impart black, white, magenta, cyan, yellow, green, orange, and gloss colors such as gold and silver, depending on the intended purpose of the composition and requisite properties thereof. A content of the colorant in the composition is not particularly limited, and may be appropriately determined considering, for example, a desired color density and dispersibility of the colorant in the composition. However, it is preferably from 0.1% by mass to 20% by mass relative to the total mass (100% by mass) of the composition. Incidentally, the activeenergy-ray-curable composition of the present disclosure does not necessarily contain a colorant but can be clear and colorless. In such a case, for example, such a clear and colorless composition is good for an overcoating layer to protect an image.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxazine pigments, thioindigo pigments, isoindolinone pigments, and quinofuranone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment. The dispersant has no particular limit and can be, for example, polymer dispersants conventionally used to prepare pigment dispersion (material).

The dyes include, for example, acidic dyes, direct dyes, reactive dyes, basic dyes, and combinations thereof.

Organic Solvent

The active-energy-ray-curable composition of the present disclosure optionally contains an organic solvent although it is preferable to spare it. The active-energy-ray-curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

Other Components

The active-energy-ray-curable composition of the present disclosure optionally contains other known components. The other known components are not particularly limited. Specific examples thereof include, but are not limited to, known articles such as surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

Preparation of Active-Energy-Ray-Curable Composition

The active-energy-ray-curable composition of the present disclosure can be prepared by using the components described above. The preparation devices and conditions are not particularly limited. For example, the active-energy-ray-curable composition can be prepared by subjecting a polymerizable monomer, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization inhibitor, and a surfactant.

Viscosity

The viscosity of the active-energy-ray-curable composition of the present disclosure has no particular limit because it can be adjusted depending on the purpose and application devices. For example, if an ejecting device that ejects the composition from nozzles is employed, the viscosity thereof is preferably in the range of 3 mPa·s to 40 mPa·s, more preferably 5 mPa·s to 15 mPa·s, and particularly preferably 6 mPa·s to 12 mPa·s in the temperature range of 20 degrees C. to 65 degrees C., preferably at 25 degrees C. In addition, it is particularly preferable to satisfy this viscosity range by the composition free of the organic solvent described above. Incidentally, the viscosity can be measured by a cone plate rotary viscometer (VISCOMETER TVE-22L, manufactured by TOKI SANGYO CO.,LTD.) using a cone rotor (1°34'× R24) at a number of rotation of 50 rpm with a setting of the temperature of hemathermal circulating water in the range of 20 degrees C. to 65 degrees C. VISCOMATE VM-150III can be used for the temperature adjustment of the circulating water.

Application Field

The application field of the active-energy-ray-curable composition of the present disclosure is not particularly limited. It can be applied to any field where active-energy-ray-curable materials are used. For example, the active-energy-ray-curable composition is selected to a particular application and used for a resin for processing, a paint, an adhesive, an insulant, a releasing agent, a coating material, a sealing material, various resists, and various optical materials.

Furthermore, the active-energy-ray-curable composition of the present disclosure can be used to form two-dimensional texts, images, and designed coating film on various substrates and in addition as a solid object forming material to form a three-dimensional object. This three-dimensional object forming material may also be used as a three-dimensional object constituent material (a model material) and a supporting member used in an additive manufacturing method (a stereolithography method) as illustrated in FIG. 1, FIG. 2A, FIG. 2B, FIG. 2C, and FIG. 2D. FIG. 1 is a diagram illustrating a method of additive manufacturing to sequentially form layers of the active-energy-ray-curable composition of the present disclosure one on top of the other by repeating discharging the active-energy-ray-curable composition to particular areas followed by curing upon irradiation of an active energy ray.

An image forming apparatus 39 illustrated in FIG. 1 sequentially forms thin layers one on top of the other using a head unit having inkjet heads arranged movable in the directions indicated by the arrows A and B. In the image forming apparatus 39, an ejection head unit 30 for additive manufacturing ejects a first active-energy-ray-curable composition, and ejection head units 31 and 32 for support eject a second active-energy-ray-curable composition having a different composition from the first active-energy-ray-curable composition, while ultraviolet irradiators 33 and 34 adjacent to the ejection head units 31 and 32 cure the compositions. To be more specific, for example, after the ejection head units 31 and 32 for support eject the second active-energy-ray-curable composition onto a substrate 37 for additive manufacturing and the second active-energy-ray-curable composition is solidified by irradiation of an active energy ray to form a first substrate layer having a space for composition, the ejection head unit 30 for additive manufacturing ejects the first active-energy-ray-curable composition onto the pool followed by irradiation of an active energy ray for solidification, thereby forming a first additive manufacturing layer. This step is repeated multiple times lowering the stage 38 movable in the vertical direction to laminate the supporting layer and the additive manufacturing layer to fabricate a solid object 35. Thereafter, an additive manufacturing support 36 is removed, if desired. Although only a single ejection head unit 30 for additive manufacturing is provided to the image forming apparatus illustrated 39 in FIG. 1, it can have two or more units 30.

FIGS. 2A to 2D are each a diagram illustrating a method of additive manufacturing to sequentially form cured layers 6 having respective predetermined forms one on top of the other on a movable stage 3 by irradiating a storing pool (storing part) 1 of the active-energy-ray-curable composition 5 of the present disclosure with the active energy ray 4.

An apparatus for fabricating a three-dimensional object by the active-energy-ray-curable composition of the present disclosure is not particularly limited and can be a known apparatus. For example, the apparatus includes a containing device, a supplying device, and a discharging device of the active-energy-ray-curable composition, and an active energy ray irradiator.

In addition, the present disclosure includes cured materials obtained by curing the active-energy-ray-curable composition and processed products obtained by processing structures having the cured materials on a substrate. Particularly, they are preferably used as a polymerizable dental material. The processed product is fabricated by, for example, heat-drawing and punching a cured material or structure having a sheet-like form or film-like form. The processed product can suitably be used in applications necessary for molding a surface after decoration (e.g., meters or operation panels of vehicles, office machines, electric and electronic machines, and cameras).

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

Composition Stored Container

The composition stored container of the present disclosure contains the active-energy-ray-curable composition or a polymerizable dental material composition and is suitable for the applications as described above. In addition, the container can be of any size, any form, and any material. For example, the container can be designed to a particular application. It is preferable to use a light blocking material to block the light or cover a container with a light blocking sheet, etc.

EXAMPLES

Hereinafter, Examples of the present disclosure will be described. However, the scope of the present disclosure should not be construed as being limited to these Synthesis Examples and Examples.

Among the compounds of (A-1) to (A-20) presented as an example of the compound represented by the General Formula (I), Synthesis Examples of A-1, A-2, A-3, A-6, A-7, A-8, and A-12 and NMR spectrum values of the respective compounds are presented below.

Synthesis Example 1

Synthesis Example of (A-1)

A 100-mL three-neck flask was charged with trimethylolpropane triacrylate (ARONIX M-309, available from Toagosei Co., Ltd.) (5.93 g, 20 mmol), and morpholine (5.40 g, 62 mmol) was added dropwise thereto while the resultant was cooled with ice. After the dropping was completed, the temperature thereof was returned to room temperature, followed by stirring for 1 hour. The crude product was purified through silica gel column chromatography (packing material: Wakogel C-300, eluent: ethyl acetate) to thereby obtain a target product (7.0 g, yield: 63%) as a colorless liquid.

NMR Spectrum Value $^1$H-NMR (500 MHz, $CDCl_3$): δ0.90(t, 3H), 1.49(q, 2H), 2.45(br, 12H), 2.51(t, 6H), 2.66(t, 6H), 3.68(t, 12H), 4.06(s, 6H)

Synthesis Example 2

Synthesis Example of (A-2)

A 100-mL three-neck flask was charged with trimethylolpropane triacrylate (ARONIX M-309, available from Toagosei Co., Ltd.) (8.89 g, 30 mmol), and morpholine (5.23 g, 60 mmol) was added dropwise thereto while the resultant was cooled with ice. After the dropping was completed, the temperature thereof was returned to room temperature, followed by stirring for 2 hours. The crude product was purified through silica gel column chromatography (packing material: Wakogel C-300, eluent: ethyl acetate) to thereby obtain a target product (1.8 g, yield: 12%) as a colorless liquid.

NMR Spectrum Value $^1$H-NMR (500 MHz, $CDCl_3$): δ0.91(t, 3H), 1.51(q, 2H), 2.45(br, 8H), 2.51(t, 4H), 2.66(t, 4H), 3.68(t, 8H), 4.08(s, 4H), 4.12(s, 2H), 5.86-5.88(dd, 1H), 6.09-6.15(q, 1H), 6.39-6.43(dd, 1H)

Synthesis Example 3

Synthesis Example of (A-3)

A 100-mL three-neck flask was charged with trimethylolpropane triacrylate (ARONIX M-309, available from Toagosei Co., Ltd.) (11.85 g, 40 mmol) and ethyl acetate (20 ml), and morpholine (3.48 g, 40 mmol) was added dropwise thereto while the resultant was cooled with ice. After the dropping was completed, the temperature thereof was returned to room temperature, followed by stirring for 1 hour. A polymerization inhibitor (MEHQ) was added thereto. The crude product was purified through silica gel column chromatography (packing material: Wakogel C-300, eluent hexane/ethyl acetate=1/1) to thereby obtain a target product (4.5 g, lo yield: 30%) as a colorless liquid.

NMR Spectrum Value $^1$H-NMR (500 MHz, $CDCl_3$): δ0.92(t, 3H), 1.53(q, 2H), 2.44(br, 4H), 2.51(t, 2H), 2.66(t, 2H), 3.67(t, 4H), 4.11(s, 2H), 4.15(s, 4H), 5.85-5.88(dd, 2H), 6.09-6.15(q, 2H), 6.39-6.43(dd, 2H)

Synthesis Example 4

Synthesis Example of (A-6)

A 100-mL three-neck flask was charged with trimethylolpropane trimethacrylate (SR-350, available from ARKEMA) (10.15 g, 30 mmol), and morpholine (3.13 g, 36 mmol) was added dropwise thereto. Then, the resultant was allowed to react under heating at 45° C. for 12 hours. The crude product was purified through silica gel column chromatography (packing material: Wakogel C-300, eluent: hexane/ethyl acetate=3/1) to thereby obtain a target product (4.9 g, yield: 38%) as a colorless liquid.

NMR Spectrum Value $^1$H-NMR (500 MHz, $CDCl_3$): δ0.93(t, 3H), 1.13(d, 3H), 1.56(q, 2H), 1.95(t, 6H), 2.27(q, 1H), 2.36(br, 2H), 2.47(br, 2H), 2.63(t, 1H), 2.70-2.73(m, 1H), 3.64(t, 4H), 4.11(d, 2H), 4.14(s, 4H), 5.58-5.59(m, 2H), 6.10-6.11(m, 2H)

Synthesis Example 5

Synthesis Example of (A-7)

A 100-mL three-neck flask was charged with glycerin triacrylate (ARONIX MT-3547, available from Toagosei Co., Ltd.) (3.62 g, 30 mmol) and ethyl acetate (20 ml), and morpholine (8.10 g, 93 mmol) was added dropwise thereto while the resultant was cooled with ice. After the dropping was completed, the temperature thereof was returned to room temperature, followed by stirring for 1 hour. The crude product was purified through silica gel column chromatography (packing material: Wakogel C-300, eluent ethyl acetate) to thereby obtain a target product (9.0 g, yield: 58%) as a colorless liquid.

NMR Spectrum Value $^1$H-NMR (500 MHz, $CDCl_3$): δ2.45(br, 12H), 2.52(m, 6H), 2.67(m, 6H), 3.69(t, 12H), 4.21(dd, 2H), 4.32(dd, 2H), 5.28(m, 1H)

Synthesis Example 6

Synthesis Example of (A-8)

A 300-mL three-neck flask purged with nitrogen gas was charged with tetrahydrofuran-2-carboxylic acid (available from Tokyo Chemical Industry Co., Ltd.) (1.69 g, 14.5 mmol), dehydrated dichloromethane (50 mL), triethylamine (5.45 mL, 39.3 mmol), 4-dimethylaminopyridine (available from Tokyo Chemical Industry Co., Ltd.) (0.177 g, 1.45 mmol), and 2-methyl-6-nitrobenzoic anhydride (available from Tokyo Chemical Industry Co., Ltd.) (5 g, 14.5 mmol) and the resultant was stirred for 10 minutes at room temperature. Then, trimethylolpropane (0.54 g, 4.02 mmol) was gradually added to the reaction liquid, and was stirred for 12 hours at room temperature.

The reaction liquid was transferred to a separatory funnel and was washed with an aqueous solution of saturated sodium hydrogen carbonate, followed by a saturated saline solution. Sodium sulfate was added to the organic phase for drying and the solvent was removed under reduced pressure. The crude product was purified through silica gel column chromatography (packing material: Wakogel C-300, eluent: hexane/ethyl acetate=1/1) to thereby obtain a target product (1.6 g, yield: 94%) as a colorless liquid.

NMR Spectrum Value $^1$H-NMR (500 MHz, $CDCl_3$): δ0.91(t, 3H), 1.49(q, 2H), 1.93(m, 6H), 1.96(m, 3H), 2.25(m, 3H), 3.93(m, 3H), 3.99 (m, 3H), 4.09(m, 6H), 4.46(q, 3H)

Synthesis Example 7

Synthesis Example of (A-12)

A 50-mL three-neck flask was charged with tripropylene glycol diacrylate (ARONIX M-220, available from Toagosei Co., Ltd.) (3.00 g, 10 mmol), and morpholine (1.92 g, 22 mmol) was added dropwise thereto while the resultant was cooled with ice. After the dropping was completed, the temperature thereof was returned to room temperature, followed by stirring for 1 hour. The crude product was purified through silica gel column chromatography (packing material: Wakogel C-300, eluent: hexane/ethyl acetate=1/2) to thereby obtain a target product (4.4 g, yield: 93%) as a colorless liquid.

NMR Spectrum Value $^1$H-NMR (500 MHz, $CDCl_3$): δ 1.11-1.24(m, 9H), 2.46 (br, 8H), 2.49(m, 4H), 2.68(m, 4H), 3.30-3.61(m, 6H), 3.69(t, 8H), 5.01-5.11(m, 3H)

Examples 1 to 9 and Comparative Examples 1 to 3

Preparation of Active-Energy-Ray-Curable Composition

Based on materials and contents (parts by mass) presented in Table 1, active-energy-ray-curable compositions of Examples and Comparative Examples were prepared through the conventional method. Here, signs presenting the respective compounds in Table 1 correspond to the signs of the compounds exemplified above.

Regarding the active-energy-ray-curable compositions of Examples and Comparative Examples, a film (10 μm) of each active-energy-ray-curable composition was prepared on a PET film (E5100, thickness of 100 μm, available from TOYOBO CO., LTD.) in order to evaluate an extracted amount, and a film (10 μm) of each active-energy-ray-curable composition was prepared on a PC (polycarbonate) substrate (NF-2000, thickness of 500 μm, available from MITSUBISHI GAS CHEMICAL COMPANY, INC.) in order to evaluate the pencil hardness. Each film was cured using a metal halide lamp (1000 mJ/cm$^2$) available from USHIO INC.

Here, the abbreviations in Table 1 are as follows.

B-1: M-220, available from Toagosei Co., Ltd.

B-2: M-309, available from Toagosei Co., Ltd.

B-10: R-684, available from Nippon Kayaku Co., Ltd.

B-16: Viscoat #150, available from OSAKA ORGANIC CHEMICAL INDUSTRY LTD.

C-1: Irgacure 907, available from BASF

C-4: Lucirin TPO, available from BASF

CB: MICROLITH Black C-K (carbon black pigment), available from Ciba Japan K.K.

Blue: MICROLITH Blue 4G-K, available from Ciba Japan K.K.

Extracted Amount

The active-energy-ray-curable compositions of Examples and Comparative Examples were evaluated as follows.

(1) A cured film (1 cm square) on the PET film was cut.

(2) The film obtained in (1) was immersed in a solvent (acetone, acetonitrile) (1.67 g) and was left to stand for 24 hours.

(3) The solvent was filtrated and was analyzed through GC-MS and LC-MS to evaluate an extracted amount.

Evaluation criteria are as follows.

A: Extracted amount of less than 1 ppm

B: Extracted amount of 1 ppm or more but less than 5 ppm

C: Extracted amount of 5 ppm or more but less than 10 ppm

D: extracted amount of 10 ppm or more

Pencil Hardness

The pencil hardness test was performed according to JIS K5600-5-4 (scratch hardness: pencil method). Results are presented in Table 1.

TABLE 1

| | | Ex. 1 | Ex. 2 | Ex. 3 | Ex. 4 | Ex. 5 | Comp. Ex. 1 | Ex. 6 | Ex. 7 | Comp. Ex. 2 | Ex. 8 | Ex. 9 | Comp. Ex. 3 |
|---|---|---|---|---|---|---|---|---|---|---|---|---|---|
| Compound of | A-1 | | | | 15 | | | | | | | | |
| General | A-2 | | | | | 5 | | | | | | | |
| Formula (I) | A-3 | 10 | 10 | 10 | | | | | 5 | | | | |
| | A-6 | | | | | | | 10 | | | | | |
| | A-7 | | | | | | | | 5 | | | | |
| | A-8 | | | | | | | | | | 10 | | |
| | A-12 | | | | | | | | | | | 20 | |
| Radically | B-1 | | | | | | | | | | 20 | 20 | 20 |
| polymerizable | B-2 | 20 | 20 | 20 | 20 | 20 | 20 | | | | 20 | 20 | 20 |
| compound | B-10 | | | | | | | 50 | 50 | 50 | | | |
| | B-16 | 80 | 80 | 80 | 80 | 80 | 80 | | | | 60 | 60 | 60 |
| Polymerization | C-1 | 7 | 7 | 7 | 7 | 7 | 7 | 10 | 10 | 10 | 10 | 10 | 10 |
| initiator | C-4 | | | | | | | | | | 5 | 5 | 5 |
| Colorant | CB | | 3 | | | | | | | | | | |
| | Blue | | | 5 | | | | | | | | | |
| Pencil hardness | | H | H | F | H | 2H | 4B | 2B | 3B | 5B | 3B | 2B | 6B |
| Extracted amount | Compound of General Formula (I) | B | B | B | A | A | — | A | A | — | A | A | — |
| | Radically polymerizable compound | A | A | A | A | A | A | A | A | A | A | A | A |
| | Polymerization initiator | A | A | A | B | A | C | C | C | D | C | C | D |

From the results of Table 1, it is found that the active-energy-ray-curable composition of the present disclosure enhances pencil hardness and suppresses an extracted amount of a polymerization initiator.

Application Example as Inkjet Ink

Three kinds of inkjet inks including the active-energy-ray-curable compositions of Examples 1 to 3 were evaluated for curability and ink dischargeability as follows.

Evaluation Method

Each inkjet ink prepared based on the materials and the contents (parts by mass) presented in Table 1 was loaded into an inkjet ejection apparatus (available from Ricoh Company, Ltd., head: GEN 4 available from Ricoh Printing Systems, Ltd.). The ink was discharged on a commercially available polyethylene terephthalate (PET) film (E5100, thickness of 100 μm, available from TOYOBO CO., LTD.). The formed solid coated film having an average thickness of 10 μm was cured at illuminance of 0.2 W/$cm^2$ using an UV irradiator (LH6, available from Fusion Systems Japan Co., Ltd.).

As a result, all the inkjet inks had a low viscosity (from 10 mPa·s to 15 mPa·s at 40° C.) and good ink dischargeability.

The present disclosure relates to an active-energy-ray-curable composition of the following (1), but includes the following embodiments of (2) to (15).

(1) An active-energy-ray-curable composition including a compound represented by General Formula (I) below:

General Formula (I)

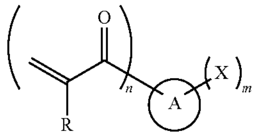

where in the General Formula (I), R is hydrogen or a methyl group; A is a structure expressed by one selected from the group consisting of Structural Formulas (II) to (VII) below, each of which may have a substituent such as an alkyl group or an alkoxy group, or both; j and k in the Structural Formulas (VI) and (VII) are an integer of 0 or more; X denotes a substituent including a heteroatom; n is an integer of 0 or more, m is an integer of 1 or more, and n+m is 3 or more, or n is an integer of 0 and m is an integer of 2; and wavy lines in the Structural Formulas (II) to (VII) each independently denote a bond with X or a (meth) acryloyl group ($H_2C{=}CR{-}C({=}O){-}$):

Structural Formula (II)

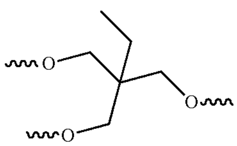

Structural Formula (III)

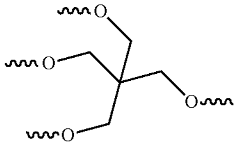

Structural Formula (IV)

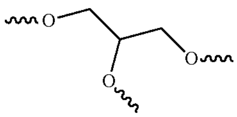

-continued

Structural Formula (V)

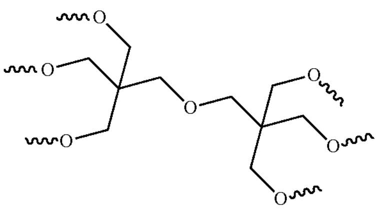

Structural Formula (VI)

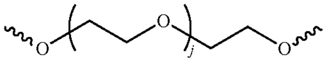

and

Structural Formula (VII)

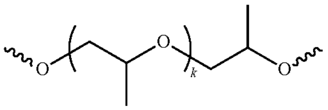

.

(2) The active-energy-ray-curable composition according to (1), further including a radically polymerizable compound, wherein the active-energy-ray-curable composition includes from 4 parts by mass to 20 parts by mass of the compound represented by the General Formula (I) relative to 100 parts by mass of the radically polymerizable compound.

(3) The active-energy-ray-curable composition according to (1) or (2), wherein, in the General Formula (I), n and m are an integer of 1 or more, and n+m is an integer of 3 or more.

(4) The active-energy-ray-curable composition according to any one of (1) to (3), wherein, in the General Formula (I), X is a cyclic substituent including a heteroatom.

(5) The active-energy-ray-curable composition according to any one of (1) to (4), further including a polymerization initiator.

(6) The active-energy-ray-curable composition according to any one of (1) to (5), wherein the compound represented by the General Formula (I) is a compound having a structure expressed by one selected from the group consisting of (A-1) to (A-20) below:

(A-1)

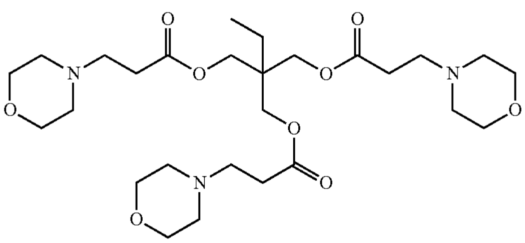

(A-2)

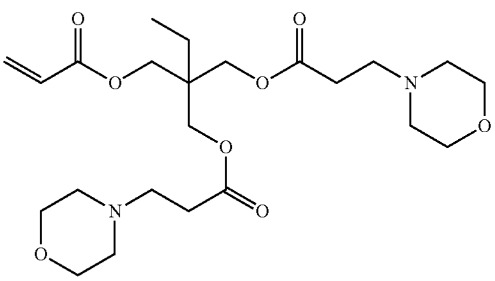

-continued
(A-3)
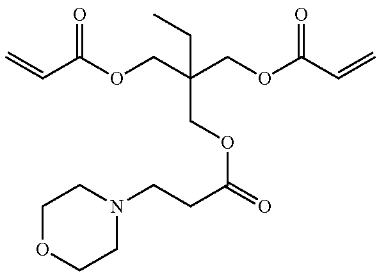
(A-4)
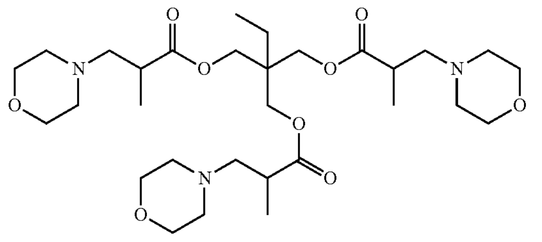
(A-5)
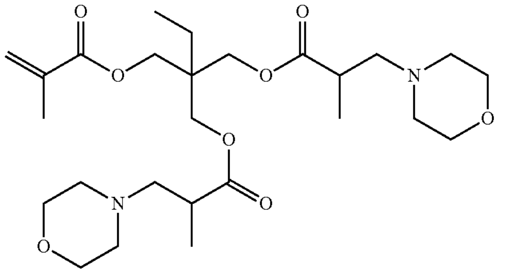
(A-6)
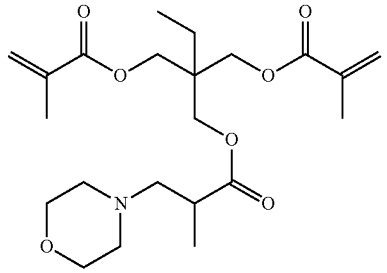
(A-7)
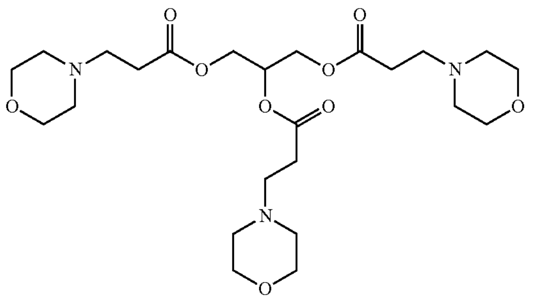
(A-8)
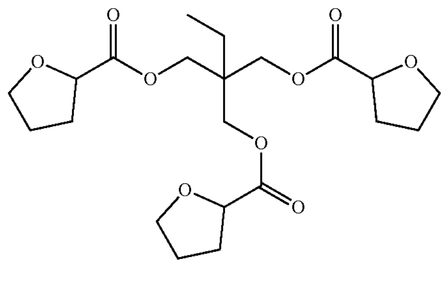
(A-9)
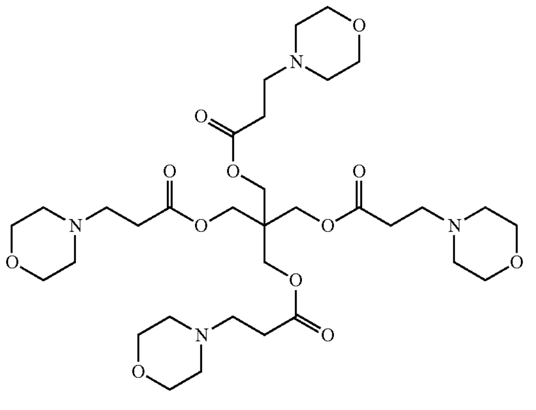
(A-10)
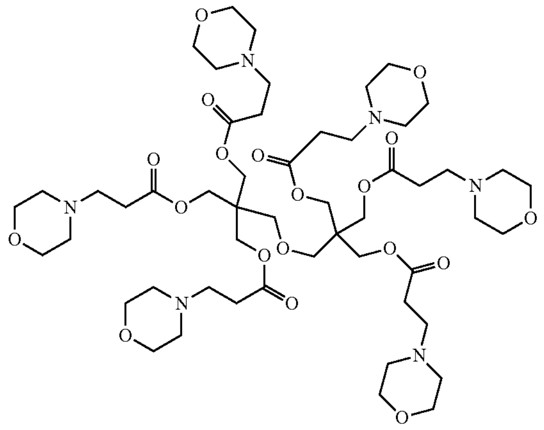
(A-11)
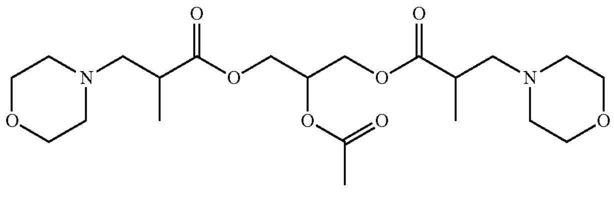

-continued
(A-12)
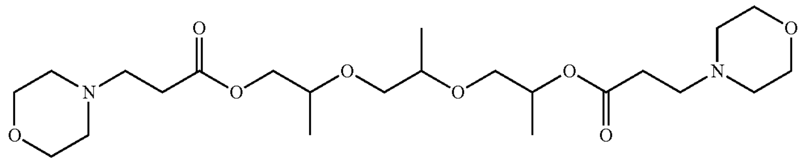
(A-13)
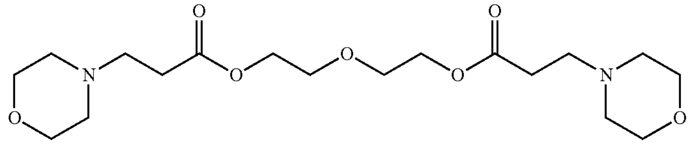
(A-14)
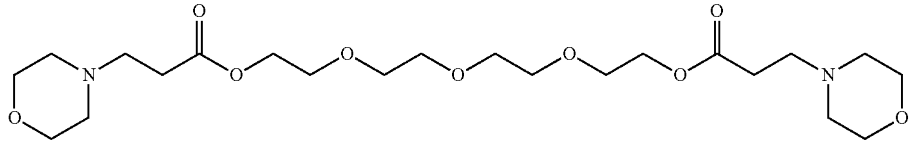
(A-15)
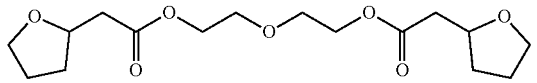
(A-16)
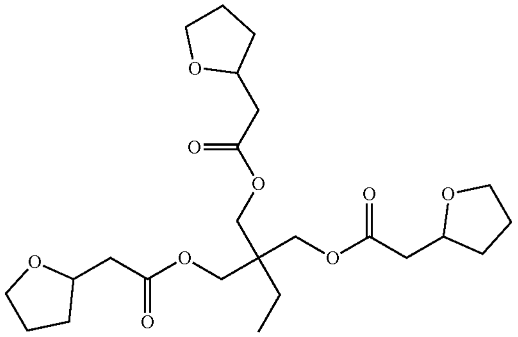
(A-17)
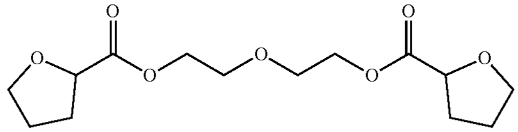
(A-18)
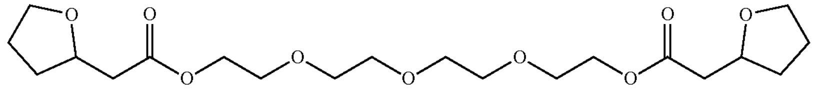
(A-19)
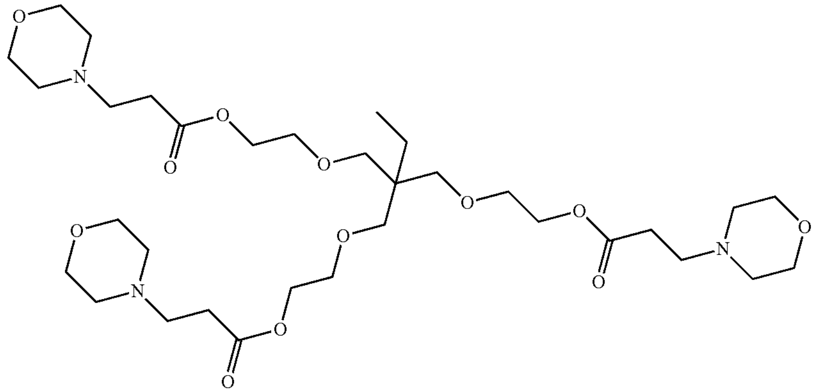
and -continued (A-20)

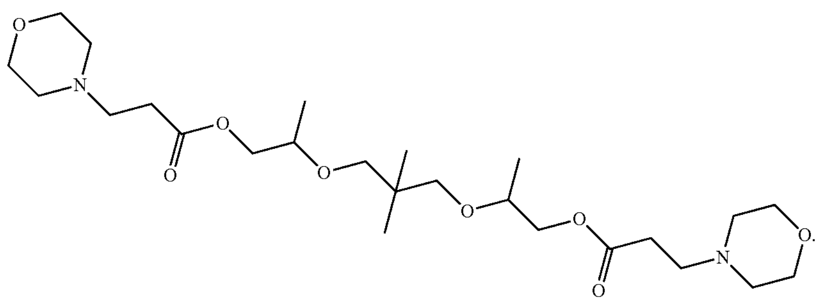

(7) The active-energy-ray-curable composition according to any one of (1) to (6), wherein the active-energy-ray-curable composition is for a material for three-dimensional object formation.

(8) An active-energy-ray-curable ink composition including the active-energy-ray-curable composition according to any one of (1) to (7).

(9) An active-energy-ray-curable inkjet ink composition including the active-energy-ray-curable ink composition according to (8).

(10) A composition stored container including:

the composition according to any one of (1) to (9); and a container, the composition being stored in the container.

(11) A two-dimensional or three-dimensional image forming apparatus including:

a storing part storing the composition according to any one of (1) to (9); and an irradiator configured to emit active energy rays.

(12) A two-dimensional or three-dimensional image forming method including irradiating the composition according to any one of (1) to (9) with active energy rays.

(13) A cured material of the composition according to any one of (1) to (9).

(14) A decorated article including:

the cured material according to (13); and a substrate, a surface of the substrate being decorated with the cured material.

(15) An active-energy-ray-curable composition including a compound represented by General Formula (I) below:

General Formula (I)

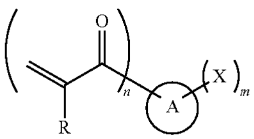

where in the General Formula (I), R is hydrogen or a methyl group; A is a multivalent alcohol residue; X denotes a substituent including a heteroatom; and n is an integer of 0 or more, m is an integer of 1 or more, and n+m is 3 or more, or n is an integer of 0 and m is an integer of 2.

What is claimed is:

1. An active-energy-ray-curable composition comprising a compound represented by General Formula (I) below:

General Formula (I)

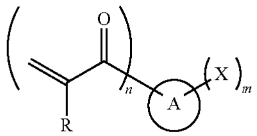

where in the General Formula (I):

R is hydrogen or a methyl group;

A is a structure expressed by one selected from the group consisting of Structural Formulas (II), (IV), (V), (VI) or (VII) below, each of which have a substituent which is optionally selected from an alkyl group or an alkoxy group, or both; j and k in the Structural Formulas (VI) and (VII) are an integer of 0 or more;

X denotes a substituent including a heteroatom;

n is an integer of 0 or more, m is an integer of 1 or more, and n+m is 3 or more, or n is an integer of 0 and m is an integer of 2; and wavy lines in the Structural Formulas (II) to (VII) each independently denote a bond with X or a (meth) acryloyl group ($H_2C{=}CR{-}C({=}O){-}$):

Structural Formula (II)

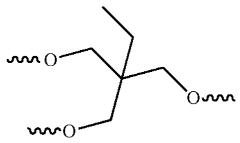

Structural Formula (III)

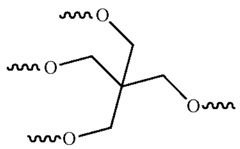

Structural Formula (IV)

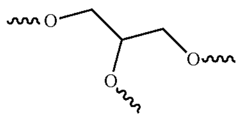

-continued

Structural Formula (V)

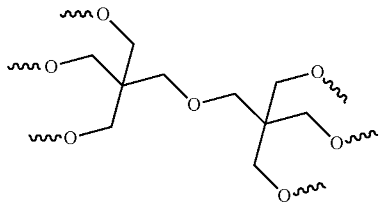

Structural Formula (VI)

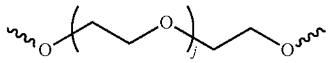

and

Structural Formula (VII)

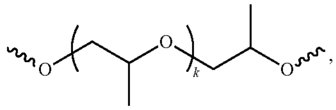

, and wherein the active-energy-ray-curable composition further comprises:

a radically polymerizable compound, wherein the active-energy-ray-curable composition includes from 4 parts by mass to 20 parts by mass of the compound represented by the General Formula (I) relative to 100 parts by mass of the radically polymerizable compound.

2. The active-energy-ray-curable composition according to claim 1, wherein, in the General Formula (I), n and m are an integer of 1 or more, and n+m is an integer of 3 or more.

3. The active-energy-ray-curable composition according to claim 1, wherein, in the General Formula (I), X is a cyclic substituent including a heteroatom.

4. The active-energy-ray-curable composition according to claim 1, further comprising a polymerization initiator.

5. The active-energy-ray-curable composition, comprising:

a compound having a structure expressed by one selected from the group consisting of (A-1) to (A-20) below:

(A-1)

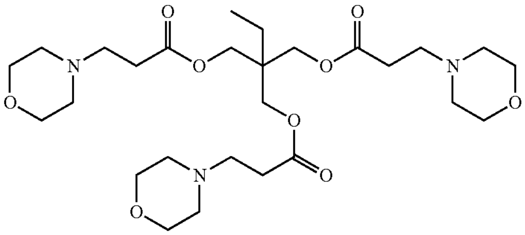

(A-2)

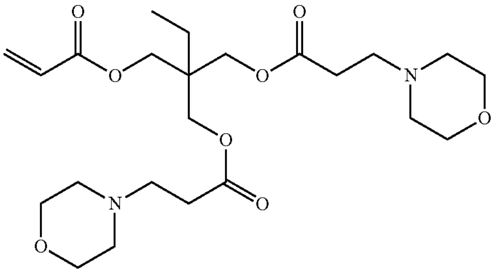

(A-3)

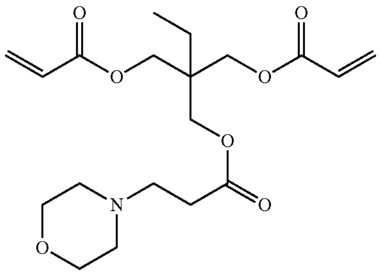

(A-4)

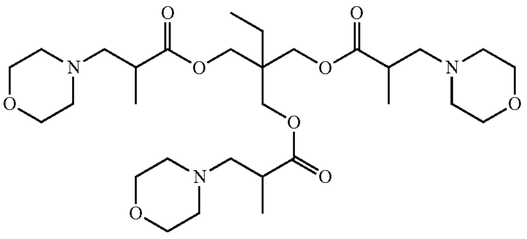

(A-5)

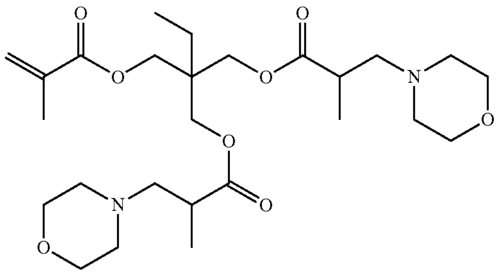

(A-6)

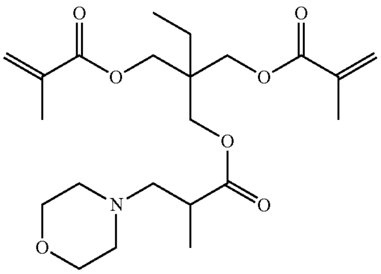

-continued
(A-7)
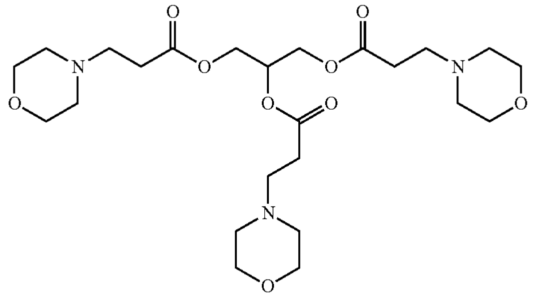
(A-8)
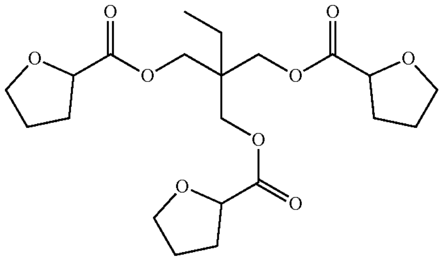
(A-9)
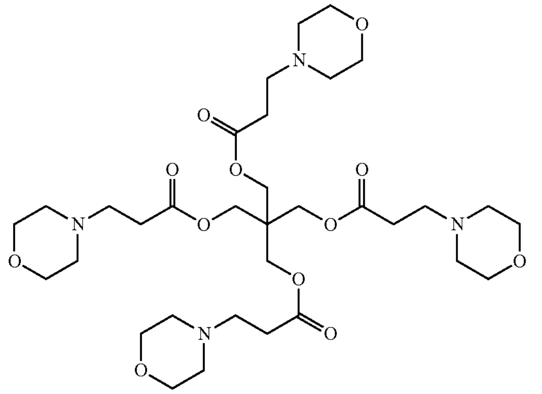
(A-10)
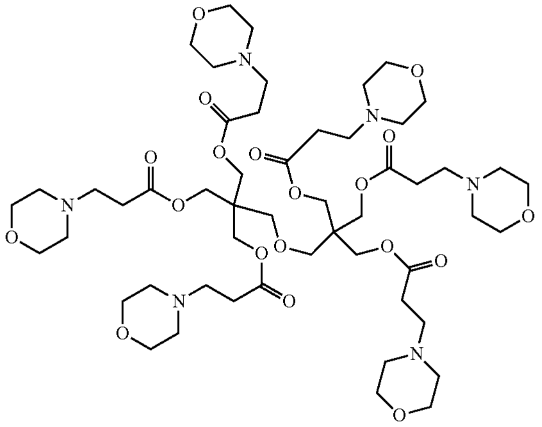
(A-11)
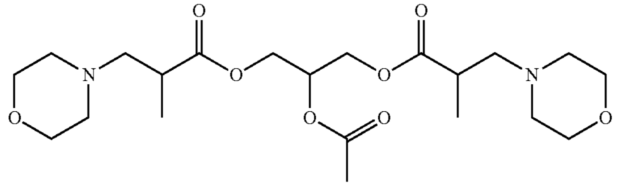
(A-12)
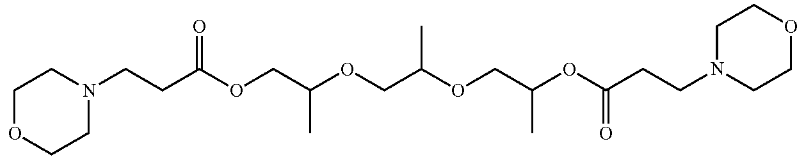
(A-13)
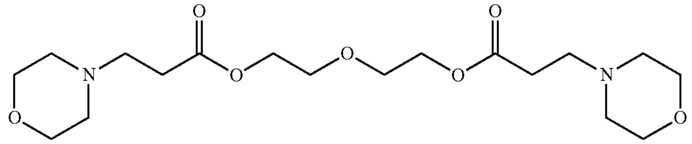
(A-14)
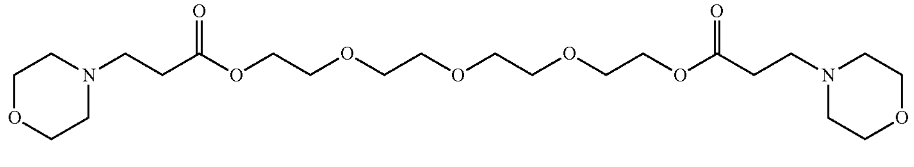

-continued (A-15)

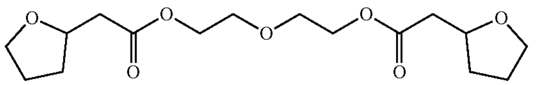

(A-16)

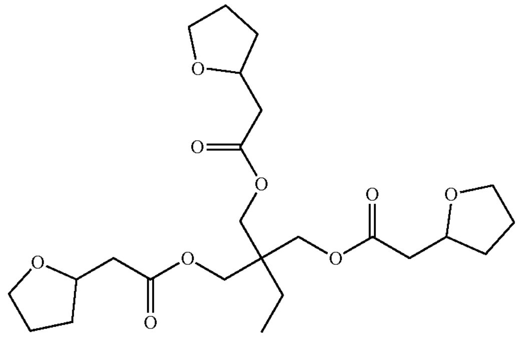

(A-17)

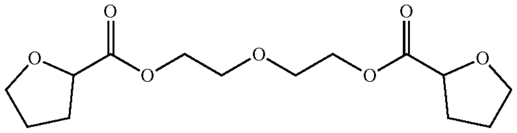

(A-18)

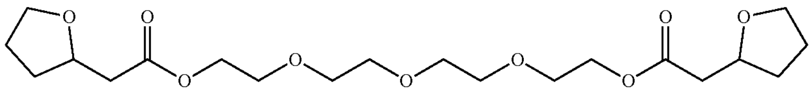

(A-19)

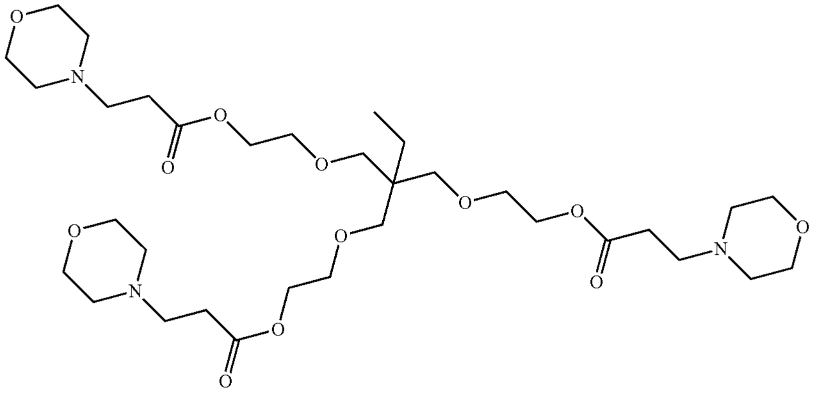

and (A-20)

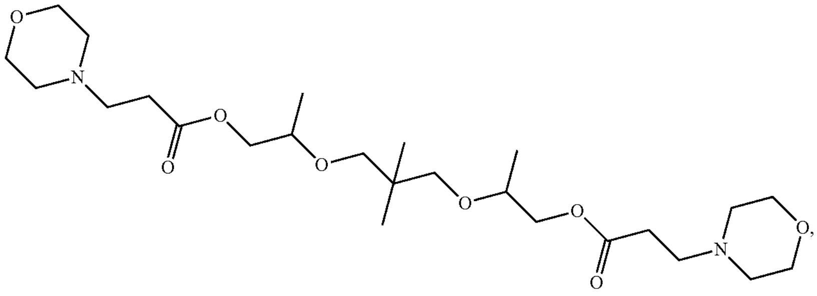

wherein the active-energy-ray-curable composition further comprises:

a radically polymerizable compound, wherein the active-energy-ray-curable composition includes from 4 parts by mass to 20 parts by mass of the compound relative to 100 parts by mass of the radically polymerizable compound.

6. The active-energy-ray-curable composition according to claim 1, wherein the active-energy-ray-curable composition is for a material for three-dimensional object formation.

7. An active-energy-ray-curable ink composition, comprising:

the active-energy-ray-curable composition according to claim 1.

8. An active-energy-ray-curable inkjet ink composition, comprising:

the active-energy-ray-curable ink composition according to claim 7.

9. A composition stored container, comprising:

the composition according to claim 1; and a container, the composition being stored in the container.

10. A two-dimensional or three-dimensional image forming apparatus, comprising:

a storing part storing the composition according to claim 1; and an irradiator configured to emit active energy rays.

11. A two-dimensional or three-dimensional image forming method, comprising:

irradiating the composition according to claim 1 with active energy rays.

12. A cured material of the composition according to claim 1.

13. A decorated article, comprising:

the cured material according to claim 12; and a substrate, a surface of the substrate being decorated with the cured material.

14. The active-energy-ray-curable composition according to claim 5, wherein the compound has the structure (A-1).

15. The active-energy-ray-curable composition according to claim 5, wherein the compound has the structure (A-2).

16. The active-energy-ray-curable composition according to claim 5, wherein the compound has the structure (A-3).

17. The active-energy-ray-curable composition according to claim 1, wherein A is a structure expressed by one selected from the group consisting of Structural Formulas (II).

18. An active-energy-ray-curable composition, comprising:

a compound represented by General Formula (I) below:

General Formula (I)

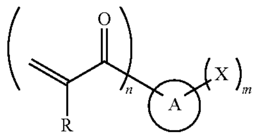

wherein the compound of General Formula (I), and where in the General Formula (I):

R is hydrogen or a methyl group;

A is a structure expressed by one selected from the group consisting of Structural Formulas (II) to (VII) below, each of which may have a substituent which is optionally selected from an alkyl group or an alkoxy group, or both; j and k in the Structural Formulas (VI) and (VII) are an integer of 0 or more;

X is an acyclic group containing a heteroatom;

n is an integer of 0 or more, m is an integer of 1 or more, and n+m is 3 or more, or n is an integer of 0 and m is an integer of 2; and wavy lines in the Structural Formulas (II) to (VII) each independently denote a bond with X or a (meth) acryloyl group ($H_2C{=}CR{-}C({=}O){-}$):

Structural Formula (II)

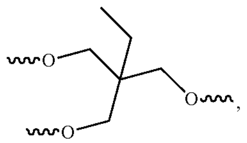

Structural Formula (III)

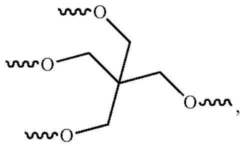

Structural Formula (IV)

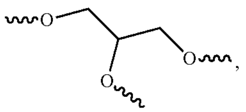

Structural Formula (V)

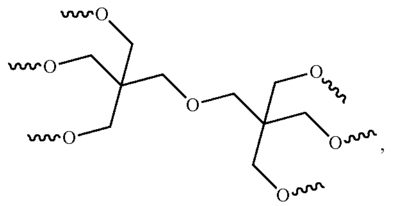

Structural Formula (VI)

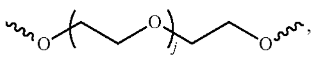

and

Structural Formula (VII)

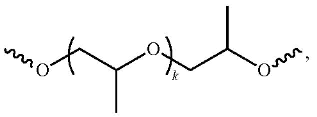

and wherein the active-energy-ray-curable composition further comprises:

a radically polymerizable compound, wherein the active-energy-ray-curable composition includes from 4 parts by mass to 20 parts by mass of the compound represented by the General Formula (I) relative to 100 parts by mass of the radically polymerizable compound.

* * * * *